United States Patent
Prakash Usgaonkar

(10) Patent No.: US 9,832,269 B2
(45) Date of Patent: Nov. 28, 2017

(54) METHODS FOR MIGRATING DATA BETWEEN HETEROGENEOUS STORAGE PLATFORMS AND DEVICES THEREOF

(71) Applicant: NetApp, Inc., Sunnyvale, CA (US)

(72) Inventor: Ameya Prakash Usgaonkar, Old Goa (IN)

(73) Assignee: NETAPP, INC., Sunnyvale, CA (US)

( * ) Notice: Subject to any disclaimer, the term of this patent is extended or adjusted under 35 U.S.C. 154(b) by 545 days.

(21) Appl. No.: 14/515,615

(22) Filed: Oct. 16, 2014

(65) Prior Publication Data

US 2016/0112514 A1    Apr. 21, 2016

(51) Int. Cl.
| | |
|---|---|
| *G06F 15/16* | (2006.01) |
| *H04L 29/08* | (2006.01) |
| *H04L 12/721* | (2013.01) |
| *H04L 12/725* | (2013.01) |
| *H04L 12/715* | (2013.01) |

(52) U.S. Cl.
CPC ........ *H04L 67/1097* (2013.01); *H04L 45/306* (2013.01); *H04L 45/64* (2013.01); *H04L 45/72* (2013.01)

(58) Field of Classification Search
USPC ........ 709/202, 203, 217, 218, 219, 226, 229
See application file for complete search history.

(56) References Cited

U.S. PATENT DOCUMENTS

| | | | | |
|---|---|---|---|---|
| 2001/0039565 A1* | 11/2001 | Gupta | ....................... | G06F 9/54 709/203 |
| 2003/0139135 A1* | 7/2003 | Rossi | ................. | H04B 7/18508 455/3.04 |
| 2014/0282827 A1* | 9/2014 | Mitchell | ............. | G06F 21/6218 726/1 |
| 2015/0189387 A1* | 7/2015 | Golyshko | ........ | H04N 21/47202 725/12 |
| 2016/0127127 A1* | 5/2016 | Zhao | ..................... | H04L 9/0852 713/171 |

OTHER PUBLICATIONS

"DR for a Vitualized World", retrieved from http://www.zerto.com/bcdr-for-enterprises/data-replication/ on Aug. 13, 2014.

* cited by examiner

*Primary Examiner* — Liangche A Wang
(74) *Attorney, Agent, or Firm* — Nixon Peabody LLP; Jeffrey Costellia

(57) ABSTRACT

A method, non-transitory computer readable medium, and storage controller computing device that establishes an application interface and a source interface to a programmable switch. A flow table of the programmable switch is updated to insert routing actions associated with the application and source interfaces. Next, when an application request received from an application is locally serviceable is determined. When the determination indicates the application request is not locally serviceable, a migration request for data associated with the application request is sent to the programmable switch from the source interface and a destination address of a source storage server is used. Additionally, a migration response to the migration request including the data from the source storage server is received from the source interface. The data is then stored locally in a destination storage server and thereby is migrated from the source storage server.

18 Claims, 5 Drawing Sheets

| From | To | Routing Action |
|---|---|---|
| Any packet from application on application host server | Source storage server | Route to application interface on destination storage controller computing device |
| Any packet from destination storage controller computing device on application interface | Application on application host server | Route to requesting application on application host server |
| Any packet from destination storage controller computing device on source interface | Application on application host server | Route to source storage server |
| Any packet from source storage server | Application on application host server | Route to requesting application on application host server |
| Any packet from destination storage controller computing device on source interface | Source storage server | Route to source storage server |
| Any packet from source storage server | Destination storage controller computing device | Route to source interface on destination storage controller computing device |

FIG. 4

METHODS FOR MIGRATING DATA BETWEEN HETEROGENEOUS STORAGE PLATFORMS AND DEVICES THEREOF

FIELD

This technology relates to migrating data in a data storage network, and more particularly, to methods and devices for migrating data between heterogeneous storage platforms in a data storage network.

BACKGROUND

Modern applications including social media applications, mobile applications, and analytics platforms, for example, require significant storage resources to host an increasing amount of data. Data center and storage administrators generally prefer to allocate the most suitable storage resources that meet the needs and service level objectives (SLOs) of these applications. As SLOs change and/or data ages over time, administrators may desire to move data from one platform to another in view of the characteristics or capabilities of the platforms, for example.

Data migration between heterogenous storage platforms is currently handled by host system software in the source platform, which initiates and coordinates the copy operation from a source to a destination. Accordingly, migration solutions for heterogenous storage platforms incur non-trivial central processing unit (CPU) overhead since host system CPUs must read data from the source storage servers and send the read data to the destination storage platform.

Additionally, storage networks often become overloaded during data migration between heterogeneous storage platforms since each transfer requires data movement from the source storage server of the source storage platform to the host system and then to the destination storage platform. While some optimization have been developed, these optimizations require customized hardware and/or application programming interfaces (APIs) or are only operable to migrate data using certain network protocols.

SUMMARY

A method for migrating data between heterogeneous storage platforms includes establishing by a storage controller computing device an application interface and a source interface to a programmable switch. A flow table of the programmable switch is updated by the storage controller computing device to insert routing actions associated with the application and source interfaces. When an application request received from an application is locally serviceable is determined by the storage controller computing device. When the determination indicates the application request is not locally serviceable, a migration request for data associated with the application request is sent by the storage controller computing device to the programmable switch from the source interface and a destination address of a source storage server is used. Additionally, a migration response to the migration request including the data from the source storage server is received by the storage controller computing device from the source interface. The data is then stored by the storage controller computing device locally in a destination storage server and thereby is migrated from the source storage server.

A host computing device includes a processor and a memory coupled to the processor which is configured to be capable of executing programmed instructions comprising and stored in the memory to establish an application interface and a source interface to a programmable switch. A flow table of the programmable switch is updated to insert routing actions associated with the application and source interfaces. Next, when an application request received from an application is locally serviceable is determined. When the determination indicates the application request is not locally serviceable, a migration request for data associated with the application request is sent to the programmable switch from the source interface and using a destination address of a source storage server. A migration response to the migration request including the data from the source storage server is received from the source interface. The data is then stored locally in a destination storage server.

A non-transitory computer readable medium having stored thereon instructions for migrating data between heterogeneous storage platforms includes executable code which when executed by a processor, causes the processor to perform steps including establishing an application interface and a source interface to a programmable switch. A flow table of the programmable switch is updated to insert routing actions associated with the application and source interfaces. When an application request received from an application is locally serviceable is determined. When the determination indicates the application request is not locally serviceable, a migration request for data associated with the application request is sent to the programmable switch from the source interface and using a destination address of a source storage server. A migration response to the migration request including the data from the source storage server is received from the source interface. The data is then stored locally in a destination storage server.

This technology provides a number of advantages including providing more efficient and effective methods, non-transitory computer readable media, and devices for migrating data between heterogeneous storage platforms. With this technology, data can be migrated without any customized hardware or APIs. Additionally, administrators do not have to physically or manually insert network devices into a storage network thereby resulting in reduced disruption for applications. Additionally, this technology is protocol agnostic, requires less overhead, and results in less network congestion during a data migration.

BRIEF DESCRIPTION OF THE DRAWINGS

FIG. 4 is an exemplary routing table of a programmable switch subsequent to being updated by a storage controller computing device.

DETAILED DESCRIPTION

Figure 1:
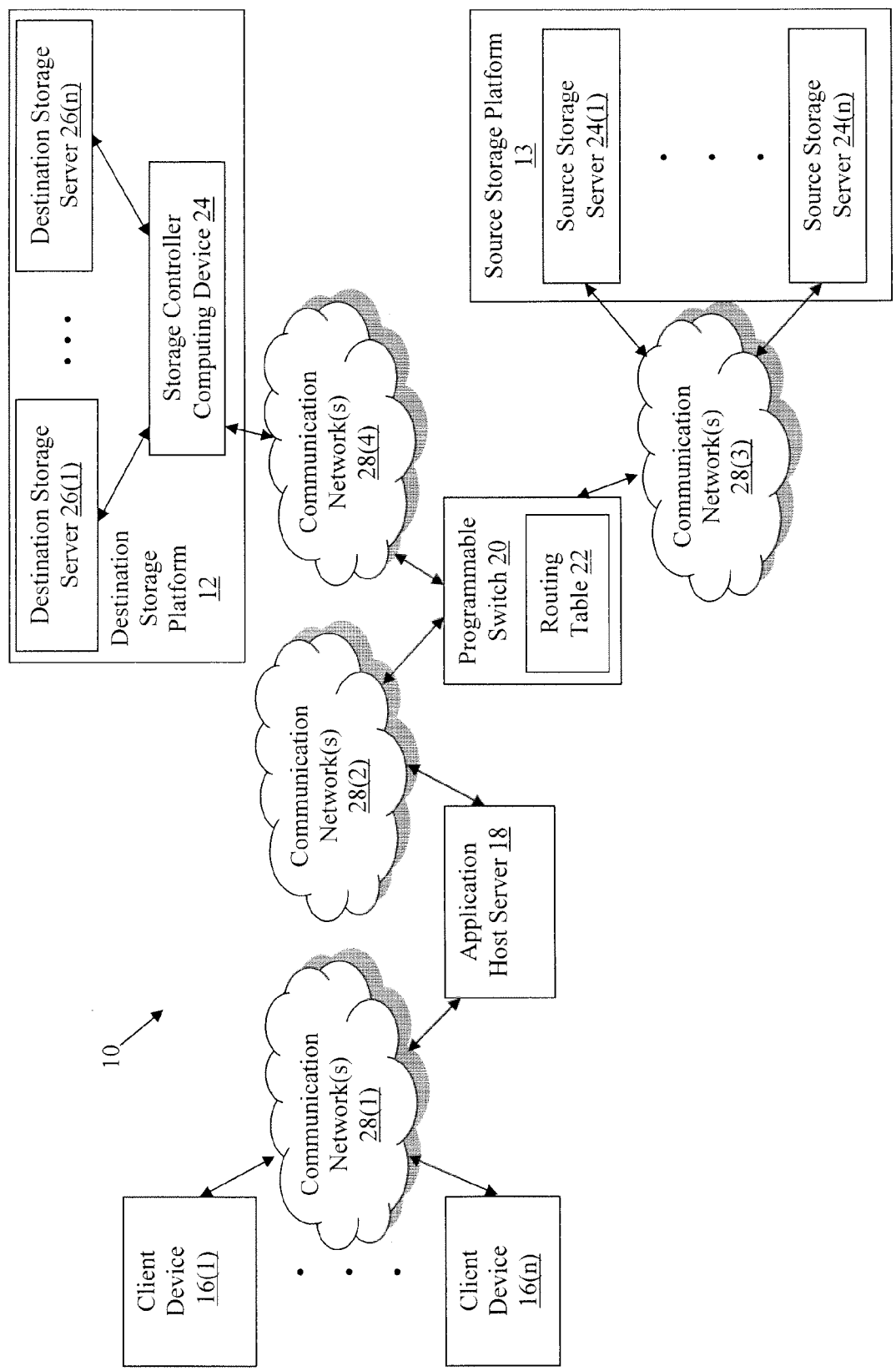
FIG. 1 a block diagram of a storage network environment with a source storage platform and a destination storage platform including an exemplary storage controller computing device.

A network environment 10 including an example of a destination storage platform 12 to which data is to be migrated from a source storage platform 13 including source storage servers 14(1)-14(n) is illustrated in FIG. 1. The environment 10 in this example further includes client devices 16(1)-16(n), an application host server 18, and a programmable switch 20 with at least one routing table 22, although this environment 10 can include other numbers and types of systems, devices, components, and/or elements in other configurations. Additionally, the destination storage platform 12 in this example includes a storage controller computing device 24 coupled to a plurality of destination storage servers 26(1)-26(n). The client devices 16(1)-16(n) communicate with applications on the application host server 18 via the communication network(s) 28(1) in this example.

In this example, the application host server 18 communicates with the source storage servers 24(1)-24(n) via the communication network(s) 28(2) and 28(3) and the programmable switch 20. Additionally, the application host server 18 communicates with the destination storage platform via the communication network(s) 28(2) and 28(4) and the programmable switch 20. This technology provides a number of advantages including methods, non-transitory computer readable media, and devices that more efficiently facilitate migration of data between heterogeneous source and destination storage platforms using software defined networking (SDN) and a programmable switch.

In this example, each of the client devices 16(1)-16(n) includes a processor, a memory, a communication interface, an input device, and a display device, which are coupled together by a bus or other communication link, although each of the client devices 16(1)-16(n) can have other types and numbers of components or other elements and other numbers and types of network devices could be used. The client devices 16(1)-16(n) may run interface applications that provide an interface to applications hosted on the application host server 18 via the communication network(s) 28(1), for example. Each of the client devices 16(1)-16(n) may be, for example, a conventional personal computer, a tablet computing device, a smart phone, a virtual machine, or other processing and/or computing device.

The application host server 18 can be an application server that hosts applications executed in a hypervisor, for example, that can be utilized by the client devices 16(1)-16(n) and which can utilize the source storage servers 24(1)-24(n) prior to a data migration, and the destination storage platform 12 subsequent to the migration, to manage associated data. The application host server 18 in this example can include a processor, a memory, and a communication interface, which are coupled together by a bus or other communication link, although the application host server 18 can have other types and numbers of components.

The programmable switch 20 can be any network switch that is compatible with an SDN protocol. The programmable switch 20 can route network traffic according to the routing table 22, which is updatable by other network-connected device(s) using the SDN protocol. In some examples the programmable switch 20 can perform other tasks with respect to network traffic including monitoring traffic, managing quality of service (QoS) of traffic, restricting traffic, or mirroring traffic, for example. In one example, the programmable switch 20 is compliant with an OpenFlow protocol and executes an OpenFlow operating system. In this example, the routing table 22 is updatable by network-connected device(s), such as the storage controller computing device 24, by sending message(s) according to OpenFlow API(s) which are interpreted by an OpenFlow controller (OFC) of the programmable switch 20, although other types of programmable switches compliant with other SDN protocols can also be used.

Each of the source storage servers 24(1)-24(n) of the source storage platform 13 and each of the destination storage servers 26(1)-26(n) in this example includes one or more storage volumes stored in a memory, a processor, and a communication interface coupled together by a bus or other communication link. The storage volumes in this example can be stored on conventional magnetic disks, solid-state drives (SSDs), or any other type of stable, non-volatile storage device suitable for storing large quantities of data. The source storage servers 24(1)-24(n) and/or the destination storage servers 26(1)-26(n) may be organized into one or more volumes of Redundant Array of Inexpensive Disks (RAID), although other types and numbers of storage servers in other arrangements can be used.

The storage controller computing device 24 of the destination storage platform 12 in this example operates on behalf of the applications executed on the application host server 18 to store, retrieve, and/or manage files or other units of data stored by the destination storage servers 26(1)-26(n) subsequent to a data migration. Accordingly, the storage controller computing device 24 manages and provisions the storage volumes of the destination storage servers 26(1)-26(n) in this example and receives and responds to various read and write requests from the applications directed to data stored in, or to be stored in, one or more of the destination storage servers 26(1)-26(n). The storage controller computing device 24 can be a standalone computing device and can optionally host one or more virtual storage controllers or virtual storage machines. In other examples, the storage controller computing device 24 is integrated with or hosted by one or more of the destination storage servers 26(1)-26(n).

Figure 2:
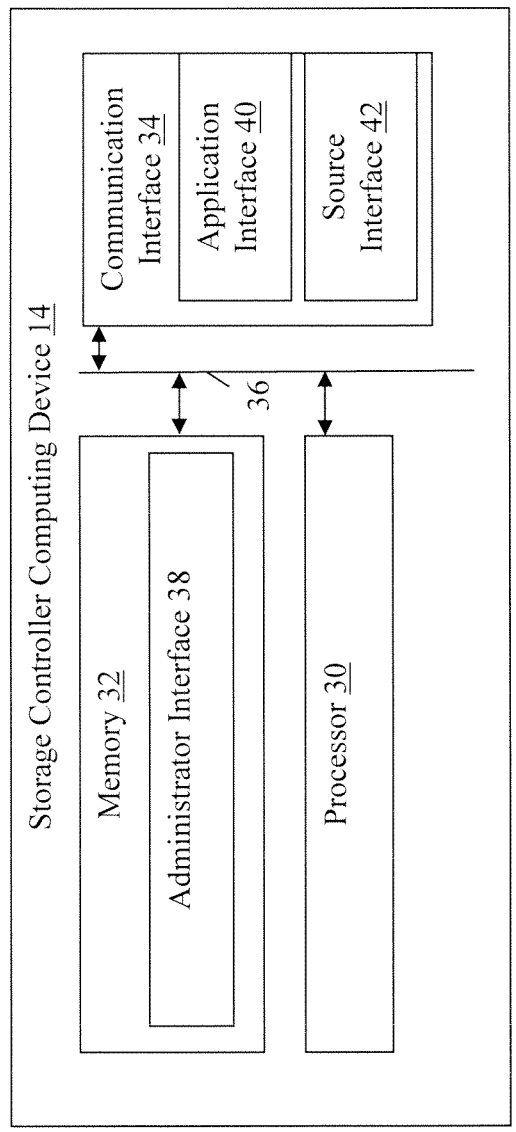
FIG. 2 is a block diagram of an exemplary storage controller computing device.

Referring to FIG. 2, a block diagram of the exemplary storage controller computing device 24 is illustrated. In this example, the storage controller computing device 24 includes a processor 30, a memory 32, a communication interface 34 coupled together by a bus 36 or other communication link. The processor 30 of the storage controller computing device 24 executes a program of stored instructions for one or more aspects of the present invention, as described and illustrated by way of the embodiments herein, although the processor 30 could execute other numbers and types of programmed instructions. The processor 30 in the storage controller computing device 24 may include one or more central processing units or general purpose processors with one or more processing cores, for example.

The memory 32 of the storage controller computing device 24 may include any of various forms of read only memory (ROM), random access memory (RAM), Flash memory, non-volatile, or volatile memory, or the like, or a combination of such devices for example. The memory 32 can host an operating system as well as store instructions that, when executed by the processor 30, instantiate one or more storage virtual machines, for example, although other types of applications and instructions for providing other functionality can also be stored in the memory 32. In this example, the memory further includes an administrator interface 42 that is provided to an administrator of the destination storage platform 12, also referred to as a storage cluster or storage virtual machine administrator, to facilitate instructing the storage controller computing device 24 to update the routing table 22 of the programmable switch 20, as well as facilitate other functionality, as described and illustrated in more detail later.

The communication interface 34 of the storage controller computing device 24 in this example can include one or more network interface controllers (NICs) for operatively coupling and communicating between the storage controller computing device 24, the programmable switch 20, and the destination storage servers 26(1)-26(n), which are coupled together by the communication network(s) 28(4), although other types and numbers of communication networks or systems with other types and numbers of connections and configurations to other devices and elements also can be used. In this example, the communication interface 34 includes an application interface 40 and a source interface 42, which can be ports such as Ethernet ports for example. The application interface 40 and the source interface 42 are used for respective types of traffic between the storage controller computing device 24 and the programmable switch 20, as described and illustrated in more detail later.

By way of example only, the communication network(s) 28(1)-28(4) can use TCP/IP over Ethernet and/or industry-standard protocols including NFS, CIFS, or iSCSI, for example, although other types and numbers of communication networks can be used. The communication network(s) 28(1)-28(4) in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 28(1)-28(4) may also comprise local area network(s) and/or wide area network(s) (e.g., Internet), although any other type of traffic network topologies may be used.

Although examples of the storage controller computing device 24, client devices 16(1)-16(n), destination storage platform 12, source storage platform 13, application host server 18, and programmable switch 20 are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
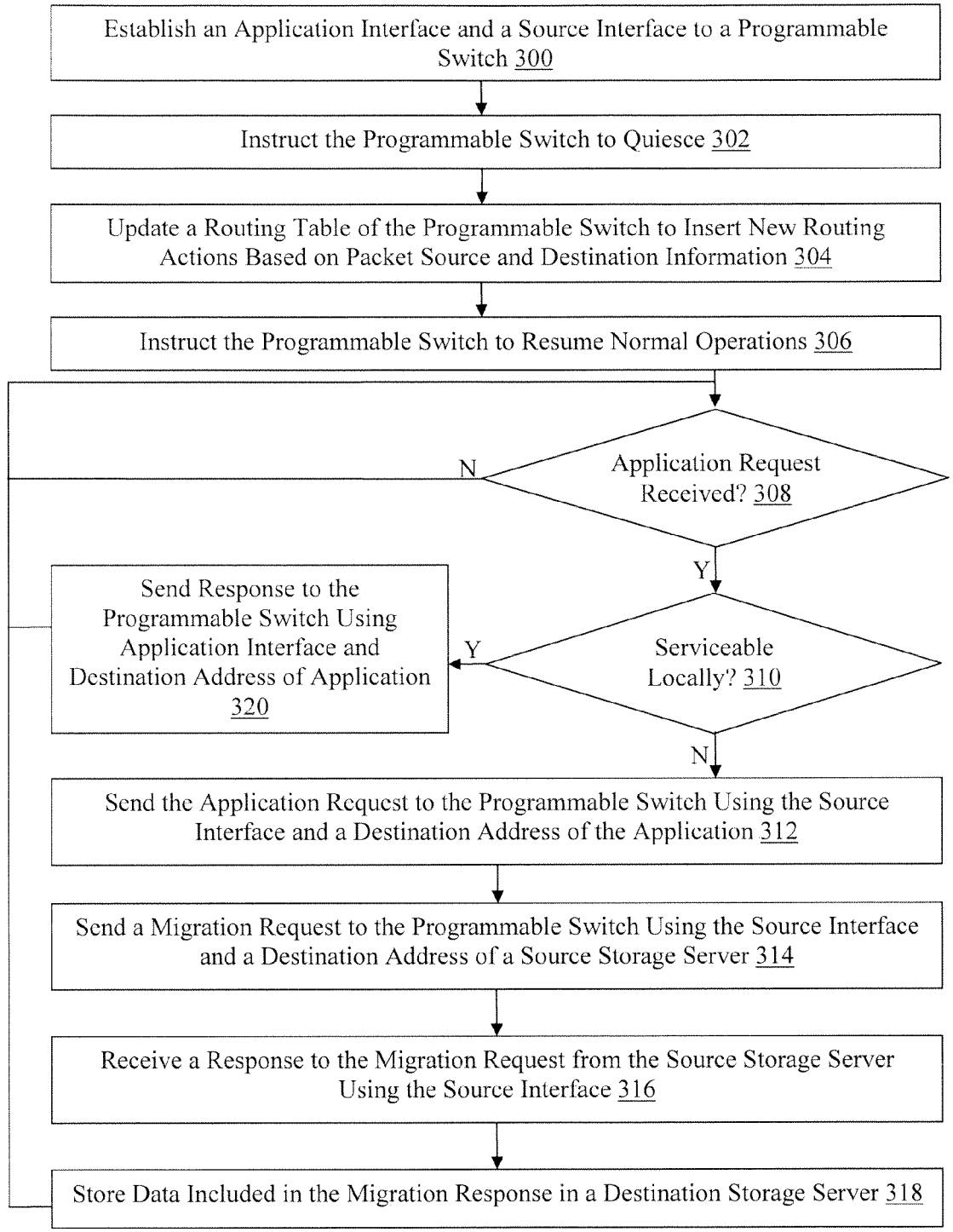
FIG. 3 is a flowchart of an exemplary method for updating a routing table of a programmable switch and facilitating data migration by a storage controller computing device.

An exemplary method for migrating data between heterogeneous storage platforms will now be described with reference to FIGS. 1-5. Referring more specifically to FIG. 3, an exemplary method for updating the routing table 22 of the programmable switch 20 and facilitating data migration by the storage controller computing device 24 is illustrated. In step 300 in this example, the storage controller computing device 24 establishes the application interface 40 and the source interface 42, although other types and/or numbers of interfaces could be generated.

In one example, an administrator of the storage controller computing device 24 establishes the application interface 40 and the source interface 42 using the provided administrator interface 38, for example, although other methods of establishing the application interface 40 and the source interface 42 can be used. The application interface 40 and source interface 42 can be physical or virtual Ethernet ports for example, although other types of interfaces to which traffic from the programmable switch 20 can be directed, and from which traffic to the programmable switch 20 can be directed, can also be used.

In step 302, the storage controller computing device 24 instructs the programmable switch 20 to quiesce. In one example in which the programmable switch 20 is compatible with the OpenFlow protocol, the storage controller computing device 24 can send a message to the programmable switch 20 invoking the OpenFlow barrier API which causes the OFC of the programmable switch 20 to drop packets received from the application host device 18 after receipt of the message and to drain any pending transfers. Optionally, the storage controller computing device 24 sends the message invoking the OpenFlow barrier API at the instruction of an administrator received via the provided administrator interface 38, although other methods of initiating the quiescing of the programmable switch 20 can also be used.

In step 304, the storage controller computing device 24 updates the routing table 22 of the programmable switch 20 to insert new routing actions based on source and destination information for received packets and the established application interface 40 and source interface 42. In one example in which the programmable switch 20 is compatible with the OpenFlow protocol, the storage controller computing device 24 can send a message invoking the OpenFlow flow table update API to the programmable switch 20.

In this example, the message includes the updated routing table information and causes the OFC of the programmable switch 20 to download the new routing table information into the routing table 22 of the programmable switch 20. Optionally, the storage controller computing device 24 sends the message invoking the OpenFlow flow table update API at the instruction of an administrator received via the provided administrator interface 38, although other methods of updating the routing table 22 of the programmable switch 20 can also be used.

Referring more specifically to FIG. 4, an exemplary routing table 22 of the programmable switch 20 subsequent to being updated by the storage controller computing device 24 is illustrated. In this example, the routing actions require the programmable switch 20 to send any packet received from an application and having a destination address of the source storage server to the application interface 40, as indicated by the first row of the routing table 22. Accordingly, packets originating from applications executing on the application host server 18 are sent first to the storage controller computing device 24 by the programmable switch 20 instead of being sent to the source storage platform 13, as described and illustrated in more detail later with reference to step 308 of FIG. 3.

Referring back to FIG. 4, in this example, the routing actions further require the programmable switch 20 to send any packets received from the application interface 40 and having a destination address of an application to the application host device 18, as indicated by the second row of the routing table 22. Packets handled by the programmable switch 20 according to the routing action of the second row of the exemplary routing table 22 are associated with application requests that are locally serviceable by the destination storage platform 12, as described and illustrated in more detail later with reference to steps 310 and 320 of FIG. 3.

Referring to the third row of the exemplary routing table 22 illustrated in FIG. 4, another of the routing actions requires that the programmable switch 20 send any packets received from the source interface 42 and having a destination address of an application to one of the source storage severs 24(1)-24(n). Packets handled by the programmable switch 20 according to the routing action of the third row of the exemplary routing table 22 are associated with application requests that are not locally serviceable by the destination storage platform 12, as described and illustrated in more detail later with reference to steps 310 and 312 of FIG. 3.

In this example, the routing actions further require the programmable switch 20 to send any packet received from one of the source storage servers 24(1)-24(n) and having a destination address of an application to the application host device 18. Accordingly, packets processed by the programmable switch 20 according to the routing action of the fourth row of the exemplary routing table 22 are associated with application requests that are not locally serviceable by the destination storage platform 12 and are instead serviced by one of the source storage servers 24(1)-24(n) of the source storage platform 13, as described and illustrated in more detail later with reference to steps 500 and 502 of FIG. 5.

Additionally, the fifth row of the exemplary routing table 22 illustrated in FIG. 4 includes a routing action that requires that the programmable switch 20 send any packets received from the source interface 42 and having a destination address of one of the source storage servers 24(1)-24(n) to the the one of the source storage servers 24(1)-24(n). Accordingly, packets routed by the programmable switch 20 according to the routing action in the fourth row of the exemplary routing table 22 are associated with a migration request sent from the storage controller computing device 24, as described and illustrated in more detail with reference to step 314 of FIG. 3.

Finally, the routing actions in the exemplary routing table 22 also require that the programmable switch 20 send any packets received from one of the source storage servers 24(1)-24(n) and having a destination address of the source interface 42 to the source interface 42 of the storage controller computing device 24. Accordingly, packets handled by the programmable switch 20 according to the sixth row of the routing table 22 are associated with migration responses sent by one of the source storage servers 24(1)-24(n), as described and illustrated with reference to steps 504 and 506 of FIG. 5.

Referring back to FIG. 3, subsequent to updating the routing table, in step 306, the storage controller computing device 24 instructs the programmable switch 20 to resume normal operations. In one example in which the programmable switch 20 is compatible with the OpenFlow protocol, the storage controller computing device 24 can send a message to the programmable switch 20 invoking the OpenFlow un-barrier API which causes the OFC of the programmable switch 20 to resume normal operation using the updated routing table 22. Optionally, the storage controller computing device 24 sends the message invoking the OpenFlow un-barrier API at the instruction of an administrator received via the provided administrator interface 38, although other methods of instructing the programmable switch 20 to resume normal operations can also be used.

In step 308, the storage controller computing device 24 determines whether an application request has been received from one of the applications executing on the application host device 18 and via the programmable switch 20. The application request can be a read or write request, for example. Prior to a cutover subsequent to a complete data migration, applications will be configured to send requests to the source storage platform. Accordingly, packets associated with the application request will have a destination address of one of the source storage servers 24(1)-24(n) irrespective of where the data required to service the request is currently stored.

The packets will be received by the programmable switch 20, from an application executing on the application host server 18, and addressed to one of the source storage servers 24(10-24(n). The programmable switch 20 will route the packets associated with the application request to the application interface 40 of the storage controller computing device 24 according to the first row of the exemplar routing table 22 illustrated in FIG. 4 in this example. Accordingly, request traffic from the application host device 18 subsequent to the updating of the routing table 22 will be routed to the storage controller computing device 24 of the destination storage platform 12 irrespective of where the data required to service the request is currently stored. If the storage controller computing device 24 determines in step 308 that an application request has not been received, then the No branch is taken back to step 308 and the storage controller computing device 24 effectively waits for an application request to be received.

However, if the storage controller computing device 24 determines that an application request has been received, then the Yes branch is taken to step 310. In step 310, the storage controller computing device 24 determines whether the request can be serviced locally. For example, if the application request is a request to read data, the storage controller computing device 12 determines whether the data has already been migrated and is stored on one of the destination storage servers 26(1)-26(n). If the storage controller computing device 24 determines that the application request is not locally serviceable, then the No branch is taken to step 312.

In step 312, the storage controller computing device 12 sends the packets associated with the application request to the programmable switch 20 using the source interface 42 and a destination address of the application host server 18 or, optionally, a destination address associated with the specific application executing on the application host server 18 that originated the application request. Upon receipt, the programmable switch 20 will route the packets associated with the application request to one of the source storage servers 24(1)-24(n) according to the third row of the exemplary routing table 22 illustrated in FIG. 4 in this example. As the data required to service the application request has not yet been migrated and is still stored on the one of the source storage servers 24(1)-24(n), the packets associated with the application request will be sent to the one of the storage severs 24(1)-24(n) and received and processed as described and illustrated in more detail later with reference to steps 500 and 502 of FIG. 5.

Referring back to FIG. 3, in step 314, the storage controller computing device 24 sends a migration request to the programmable switch 20 for the data required to service the application request using the source interface 42 and a destination address of the one of the source storage servers 24(1)-24(n). The storage controller computing device 24 will have information regarding the data and the destination address of the one of the source storage servers 24(1)-24(n) based on the application request received in step 308. Upon receipt of the packets associated with the migration request, the programmable switch 20 will route the packets to the one of the source storage servers 24(1)-24(n) according to the routing action in the fifth row of the exemplary routing table 22 illustrated in FIG. 4 in this example.

Referring back to FIG. 3, in step 316, the storage controller computing device 24 receives a response to the migration request from the one of the source storage servers 24(1)-24(n) using the source interface 42 and via the programmable switch 20. Accordingly, the one of the source storage servers 24(1)-24(n) receives the migration request and sends the migration response including the requested data to the programmable switch 20, as described and illustrated in more detail later with reference to steps 504 and 506 of FIG. 5. The programmable switch 20 then routes the packets associated with the migration response to the storage controller computing device 24 also as described and illustrated in more detail later.

Referring again to FIG. 3, in step 318, the storage controller computing device 24 stores the data included in the migration response in one of the destination storage servers 26(1)-26(n). Accordingly, the data is now migrated from the one of the source storage servers 24(1)-24(n) to the one of the destination storage servers 26(1)-26(n). However, the storage controller computing device 24 did not service the application request and did not have to wait for the data required for the application request to be migrated from the one of the source storage servers 24(1)-24(n). Additionally, the storage controller computing device 12 is able to migrate data that is most active, and most likely to be accessed again, earlier in the data migration.

Referring back to step 310, if the storage controller computing device 24 determines that the received application request can be serviced locally, then the Yes branch is taken to step 320. In step 320, the storage controller computing device 24 sends an application response to the application request, such as any data or an acknowledgement of a write transaction, for example, to the programmable switch 20 using the application interface 40 and destination address of the application host device 18 or, optionally, a destination address associated with the specific application executing on the application host device 18 that originated the application request.

Upon receipt of the application response, the programmable switch 20 will route the packets associated with the application response to the application host device 18 according to the routing action in the second row of the exemplary routing table 22 illustrated in FIG. 4 in this example. Accordingly, if the Yes branch is taken from step 310, then the data required to service the application request has already been previously migrated, as described and illustrated earlier with reference to steps 312-318 of FIG. 3.

Figure 5:
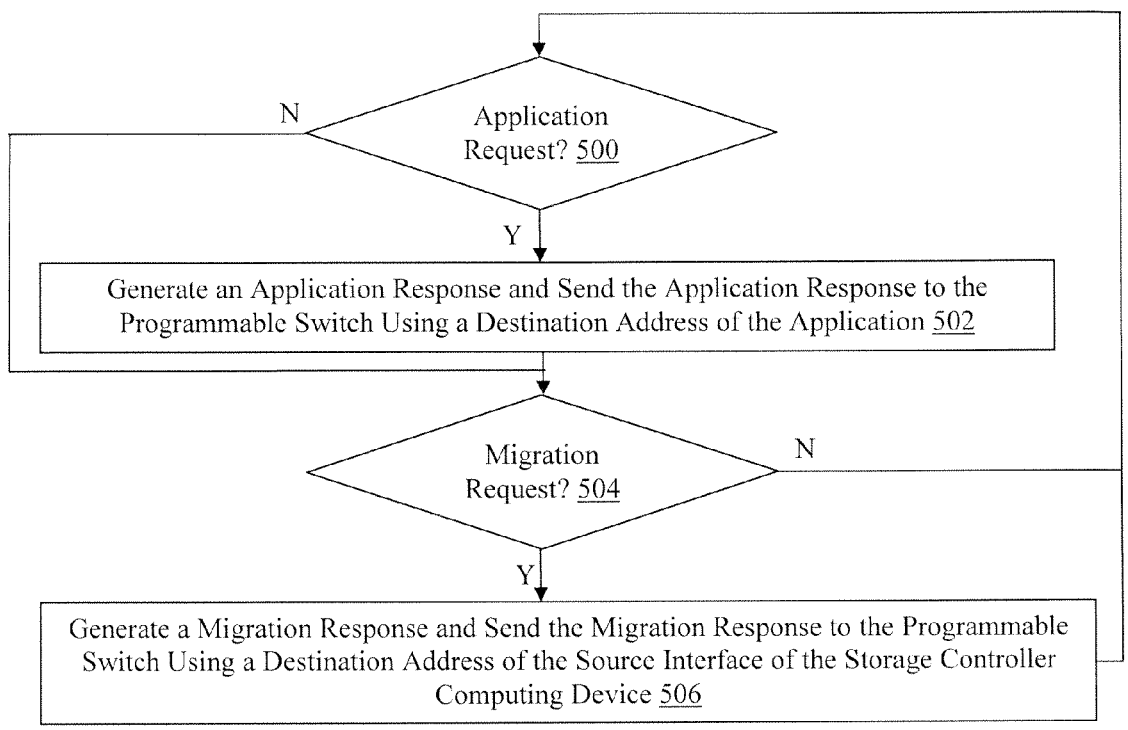
FIG. 5 is a flowchart of an exemplary method for facilitating data migration by a source storage server.

Referring more specifically to FIG. 5, an exemplary method for facilitating data migration by one of the source storage servers 24(1)-24(n) is illustrated. In step 500 in this example, the one of the source storage servers 24(1)-24(n) determines whether an application request has been received from the programmable switch 20. The application request will have necessarily originated with the storage controller computing device 24 since all application traffic is initially routed by the programmable switch 20 to the storage controller computing device 24 subsequent to the updating of the routing table, as described and illustrated earlier. Accordingly, the application request could have been sent by the storage controller computing device 24 as described and illustrated earlier with reference to step 312 of FIG. 3, for example, and could be a request that the storage controller computing device 24 determined it could not service locally. If the one of the source storage servers 24(1)-24(n) determines that an application request has been received, then the Yes branch is taken to step 502.

In step 502, the one of the source storage servers 24(1)-24(n) generates an application response and sends the application response to the programmable switch 20 using a destination address of the application host server 18, or the application associated with the request. The application response can be data responsive to a read request or an acknowledgement of a write request, for example. The application response originating from the one of the source storage servers 24(1)-24(n) and having a destination address of the application host server 18 will be routed by the programmable switch 20 to the application host server 18 according to the routing action in the fourth row of the exemplary routing table 22 illustrated in FIG. 4.

Accordingly, application requests that are not locally serviceable by the storage controller computing device 24 are instead serviced by the one of the source storage servers 24(1)-24(n). Thereby, fewer hops are required to service application requests not locally serviceable upon receipt by the storage controller computing device 24 than if the application requests were serviced by the storage controller computing device 24 subsequent to the storage controller computing device migrating the required data from the source storage platform 13. Additionally, servicing application requests from the one of the source storage servers 24(1)-24(n) also results in less delay for the requesting applications.

Subsequent to servicing the application request in step 502, or if the one of the source storage servers 24(1)-24(n) determines in step 500 that an application request has not been received, the one of the source storage servers 24(1)-24(n) proceeds to step 504. In step 504, the one of the source storage servers 24(1)-24(n) determines whether a migration request has been received from the programmable switch. The migration request will have originated with the storage controller computing device 24 and could have been sent by the storage controller computing device 24 as described and illustrated earlier with reference to step 314 of FIG. 3, for example. The migration request could be a request for data required to service the application request received in step 500 which was not locally serviceable by the storage controller computing device 24, for example. If the one of the source storage servers 24(1)-24(n) determines in step 504 that a migration request has not been received, then the No branch is taken back to step 500.

However, if the one of the source storage serves 24(1)-24(n) determines that a migration request has been received, then the Yes branch is taken to step 506. In step 506, the one of the source storage servers 24(1)-24(n) generates a migration response and sends the migration response to the programmable switch 20 using a destination address of the source interface 42 of the storage controller computing device 24. The migration response can be for data associated with the application request received in step 500 and that has yet to be migrated to one of the destination storage servers 26(1)-26(n), for example. Upon receipt of the migration response originating with the one of the source storage servers 24(1)-24(n) and having a destination address of the source interface 42 of the storage controller computing device 24, the programmable switch 20 will route the migration request to the source interface 42 of the storage controller computing device 24 according to the routing action in the sixth row of the exemplary routing table illustrated in FIG. 4.

Referring back to FIG. 3, in some examples, steps 314-318, as well as associated steps 504-506 of FIG. 5, are performed in parallel to any of steps 308-318 and 500-506 with respect to additional data stored by the source storage platform 13 and not associated with any application request. Accordingly, in come environments, data may be stored on one or more of the source storage servers 24(1)-24(n) that will never be accessed by an application or will not be accessed for a relatively long period of time and, therefore, will not be migrated. Accordingly, where there is a time constraint with respect to completion of the migration, for example, the storage controller computing device 24 can send migration requests and receive migration responses separate from any received application requests in order to more quickly facilitate a data migration. Other methods of migrating data that that has yet to be associated with any application request in order to reduce the amount of time required for a data migration can also be used.

With this technology, data can be migrated with any manual intervention in the storage network and with significantly reduced disruption to applications utilizing the backend storage. This technology is cost-effective and does not require any specific type of source storage platform, customized hardware, APIs, or any specific storage network protocol in order to migrate data between heterogeneous storage platforms. Additionally, data migrations performed using this technology advantageously require less overhead and result in reduced network congestion.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for migrating data between heterogeneous storage platforms, the method comprising:
    establishing, by a storage controller computing device, an application interface and a source interface to a programmable switch;
    updating, by the storage controller computing device, a flow table of the programmable switch to insert routing actions associated with the application interface and the source interface; and
    determining, by the storage controller computing device, when an application request received from an application is locally serviceable;
    upon a determination that the application request is not locally serviceable:
        sending, from the source interface of the storage controller computing device to the programmable switch, a migration request to migrate data associated with the application request, including a destination address of a source storage server;
        receiving, by the storage controller computing device and from the source interface, a migration response to the migration request including the data from the source storage server; and
        storing, by the storage controller computing device, the data locally in a destination storage server.

2. The method of claim 1, further comprising when the determining indicates the application request is not locally serviceable, sending, by the storage controller computing device, the application request to the source storage server to be serviced by the source storage server, the sending comprising sending the application request to the programmable switch from the source interface and using a destination address of the application.

3. The method of claim 1, further comprising when the determining indicates the application request is not locally serviceable, sending, by the storage controller computing device, an application response to the application request to the programmable switch from the application interface and having a destination address of the application.

4. The method of claim 1, wherein the routing actions comprise sending any packet received from:
    the application and having a destination address of the source storage server to the application interface;
    the application interface and having a destination address of an application to the application;
    the source interface and having a destination address of the application to the source storage sever;
    the source storage server and having a destination address of the application to the application;
    the source interface and having a destination address of the source storage server to the source storage server; and
    the source storage server and having a destination address of the source interface to the source interface.

5. The method of claim 1, further comprising instructing, by the storage controller computing device, the programmable switch to quiesce prior to the updating and to resume normal operation subsequent to the updating.

6. The method of claim 1, wherein the programmable switch is compliant with an OpenFlow protocol and the updating further comprises invoking an OpenFlow Controller (OFC) Application Programming Interface (API).

7. A storage controller computing device comprising a processor and a memory coupled to the processor which is configured to be capable of executing programmed instructions comprising and stored in the memory to:
    establish an application interface and a source interface to a programmable switch;
    update a flow table of the programmable switch to insert routing actions associated with the application and source interfaces; and
    determine when an application request received from an application is locally serviceable;
    upon a determination that the application request is not locally serviceable:
        send, from the storage interface to the programmable switch, a migration request to migrate data associated with the application request, including a destination address of a source storage server;
        receive, from the source interface, a migration response to the migration request including the data from the source storage server; and
        store the data locally in a destination storage server.

8. The host computing device of claim 7, wherein the processor coupled to the memory is further configured to be capable of executing at least one additional programmed instruction comprising and stored in the memory to, when the determination indicates the application request is not locally serviceable, send the application request to the source storage server to be serviced by the source storage server, the sending comprising sending the application request to the programmable switch from the source interface and using a destination address of the application.

9. The host computing device of claim 7, wherein the processor coupled to the memory is further configured to be capable of executing at least one additional programmed instruction comprising and stored in the memory to, when the determination indicates the application request is not locally serviceable, send an application response to the application request to the programmable switch from the application interface and having a destination address of the application.

10. The host computing device of claim 7, wherein the routing actions comprise sending any packet received from:
the application and having a destination address of the source storage server to the application interface;
the application interface and having a destination address of an application to the application;
the source interface and having a destination address of the application to the source storage sever;
the source storage server and having a destination address of the application to the application;
the source interface and having a destination address of the source storage server to the source storage server; and
the source storage server and having a destination address of the source interface to the source interface.

11. The host computing device of claim 7, wherein the processor coupled to the memory is further configured to be capable of executing at least one additional programmed instruction comprising and stored in the memory to instruct the programmable switch to quiesce prior to the updating and to resume normal operation subsequent to the updating.

12. The host computing device of claim 7, wherein the programmable switch is compliant with an OpenFlow protocol and the updating further comprises invoking an OpenFlow Controller (OFC) Application Programming Interface (API).

13. A non-transitory computer readable medium having stored thereon instructions for migrating data between heterogeneous storage platforms comprising executable code which when executed by a processor, causes the processor to perform steps comprising:
establishing an application interface and a source interface to a programmable switch;
updating a flow table of the programmable switch to insert routing actions associated with the application and source interfaces; and
determining when an application request received from an application is locally serviceable;
upon a determination that the application request is not locally serviceable:
sending, from the source interface to the programmable switch, a migration request to migrate data associated with the application request, including a destination address of a source storage server;
receiving, and from the source interface, a migration response to the migration request including the data from the source storage server; and
storing the data locally in a destination storage server.

14. The non-transitory computer readable medium of claim 13, wherein the executable code when executed by the processor further causes the processor to perform at least one additional step comprising, when the determining indicates the application request is not locally serviceable, sending the application request to the source storage server to be serviced by the source storage server, the sending comprising sending the application request to the programmable switch from the source interface and using a destination address of the application.

15. The non-transitory computer readable medium of claim 13, wherein the executable code when executed by the processor further causes the processor to perform at least one additional step comprising, when the determining indicates the application request is not locally serviceable, sending an application response to the application request to the programmable switch from the application interface and having a destination address of the application.

16. The non-transitory computer readable medium of claim 13, wherein the routing actions comprise sending any packet received from:
the application and having a destination address of the source storage server to the application interface;
the application interface and having a destination address of an application to the application;
the source interface and having a destination address of the application to the source storage sever;
the source storage server and having a destination address of the application to the application;
the source interface and having a destination address of the source storage server to the source storage server; and
the source storage server and having a destination address of the source interface to the source interface.

17. The non-transitory computer readable medium of claim 13, wherein the executable code when executed by the processor further causes the processor to perform at least one additional step comprising instructing the programmable switch to quiesce prior to the updating and to resume normal operation subsequent to the updating.

18. The non-transitory computer readable medium of claim 13, wherein the programmable switch is compliant with an OpenFlow protocol and the updating further comprises invoking an OpenFlow Controller (OFC) Application Programming Interface (API).

* * * * *